US007512477B2

(12) United States Patent
Quigley et al.

(10) Patent No.: US 7,512,477 B2

(45) Date of Patent: Mar. 31, 2009

(54) SYSTEMS AND METHODS FOR GUIDING OPERATORS TO OPTIMIZED ENGINE OPERATION

(75) Inventors: Jon M. Quigley, Lexington, NC (US); Gregory J. Prinzo, Greensboro, NC (US); Bo U. Hammerlid, Greensboro, NC (US)

(73) Assignee: Volvo Trucks North America, Inc., Greensboro, NC (US)

(*) Notice: Subject to any disclaimer, the term of this patent is extended or adjusted under 35 U.S.C. 154(b) by 0 days.

(21) Appl. No.: 11/576,028

(22) PCT Filed: Nov. 12, 2004

(86) PCT No.: PCT/US2004/037842

§ 371 (c)(1),
(2), (4) Date: Mar. 26, 2007

(87) PCT Pub. No.: WO2006/054971

PCT Pub. Date: May 26, 2006

(65) Prior Publication Data

US 2007/0203625 A1 Aug. 30, 2007

(51) Int. Cl.
*G06F 19/00* (2006.01)
*G01F 9/02* (2006.01)
*G06F 11/30* (2006.01)

(52) U.S. Cl. .................... 701/103; 701/115; 73/114.53; 702/182

(58) Field of Classification Search ......... 123/349–352, 123/361, 399, 403, 478, 480; 701/101–105, 701/110, 115; 340/438, 439; 477/107–111; 700/28, 38, 40; 702/182–186; 73/114.52, 73/114.53

See application file for complete search history.

(56) References Cited

U.S. PATENT DOCUMENTS

| | | | | |
|---|---|---|---|---|
| 4,306,284 | A * | 12/1981 | Malcolm | 700/38 |
| 4,383,514 | A | 5/1983 | Fiala | |
| 4,559,599 | A | 12/1985 | Habu et al. | |
| 5,017,916 | A | 5/1991 | Londt et al. | |
| 5,954,617 | A * | 9/1999 | Horgan et al. | 477/107 |
| 6,067,847 | A | 5/2000 | Staerzl | |
| 6,092,021 | A | 7/2000 | Ehlbeck et al. | |
| 6,094,617 | A | 7/2000 | Lapke | |
| 6,178,373 | B1 | 1/2001 | Davis et al. | |
| 6,306,063 | B1 * | 10/2001 | Horgan et al. | 477/108 |
| 6,338,018 | B1 * | 1/2002 | Baker | 701/104 |
| 6,356,831 | B1 | 3/2002 | Michelini et al. | |
| 6,512,974 | B2 * | 1/2003 | Houston et al. | 701/115 |
| 6,539,299 | B2 * | 3/2003 | Chatfield et al. | 701/104 |

FOREIGN PATENT DOCUMENTS

| | | | |
|---|---|---|---|
| EP | 0 919 419 | A1 | 6/1999 |
| WO | 82/02576 | A1 | 8/1982 |
| WO | 03/076788 | A1 | 9/2003 |

* cited by examiner

*Primary Examiner*—Willis R Wolfe, Jr.
(74) *Attorney, Agent, or Firm*—Potomac Patent Group PLLC

(57) ABSTRACT

System and methods provide information to an operator of an engine such that the engine operates with optimal performance, such as maximal fuel efficiency. Such a system may include a plurality of sensors adapted to measure operating parameters of the engine; an engine management system adapted to receive measured operating parameters from the sensors and to generate signals indicative of a current operating performance of the engine and signals indicative of performance-increasing adjustments to current operating parameters; and a display adapted to present symbols in response to signals from the engine management system. The symbols guide the operator to increase or maintain engine performance.

26 Claims, 5 Drawing Sheets

SYSTEMS AND METHODS FOR GUIDING OPERATORS TO OPTIMIZED ENGINE OPERATION

This invention relates to optimization of engine operating performance and more particularly to optimization of diesel engine performance and even more particularly to optimization of diesel engine performance in vehicles, such as over-the-highway vehicles and construction vehicles.

BACKGROUND

An internal combustion engine does not exhibit a constant high level of efficiency throughout its operating range. Each engine, and particularly each diesel engine, has an area in its torque vs. speed map where it operates most efficiently. This area can be called the "sweet spot". For heavy vehicles, such as over-the-highway tractors and trucks, the driving habits that result in operating the engine with maximum or near-maximum efficiency, in the sweet spot, are not readily apparent to the driver. Parameters affecting engine efficiency include but are not limited to engine speed, engine load, engine temperature, ambient temperature, and ambient air pressure.

Some systems provide drivers with information on vehicle performance and optimum operating point, but these systems typically may indicate only that the engine is in the sweet spot and do not indicate the changes needed to get to this favorable operating range. Without such feedback, drivers have to rely on experience and "feel", which inevitably results in less than optimal operating efficiency.

WO 03/76788 A1 by Edwards discloses a gas substitution system for a dual-fuel (diesel/liquefied petroleum gas) diesel engine that monitors load and RPM and the operational state of the engine and vehicle, including throttle displacement, cruise control, idle, wheel and engine braking, and manual control. Data is collected to establish parameters such as fuel consumption and exhaust emissions for load/RPM pair values and used to create a table of optimum gas substitution values at each load/RPM pair within the range of operational states within which substitution is viable. This arrangement does not interact with and provide feedback to the driver in real time.

WO 82/02576 describes using a microprocessor to monitor a number of vehicle operating parameters that can be displayed, for example on a light-emitting diode (LED). A keypad may be used to input other vehicle-related parameters. In addition to presenting torque, RPM, speed, etc. values, the display can change color to indicate a recommended gear change to the driver. Nevertheless, this is just a method of realizing variable compression ratio and is not a driving aid.

EP 0 919 419 A1 by Trepp discloses a remote cooperative engine control system with remote data processing in which recommended control signals may be communicated to drivers of many vehicles, either from the engine control systems or from a remote location. A display for standard vehicle data (speed, mileage, fuel) may be used for this purpose. Engine operating characteristics may be altered, for example, based upon ambient conditions (temperature, level of oxides, etc).

U.S. Pat. No. 4,383,514 to Fiala describes an arrangement for fuel supply to the combustion chambers of an engine. Fuel economy can be improved by isolating (i.e., not fueling) certain combustion chambers based upon the load on the engine. For example, fuel may be supplied to four combustion chambers under heavy load, to only two chambers under reduced load, and to no chambers under braking.

U.S. Pat. No. 4,559,599 to Habu et al. describes a shift indication apparatus, including a shift up/down indicator, based on a stored torque data map and a stored fuel consumption rate data map of an engine. Economical running of the vehicle may be realized by obeying the shift indicator.

U.S. Pat. No. 5,017,916 to Londt et al. discloses a shift prompter/information display system for indicating gear shift timing and other related data to a driver. A section of the display can indicate a target value for fuel economy when the vehicle is in a cruising mode. A target gear to which the transmission should be shifted is displayed when the engine speed is equal to the synchronous meshing speed of the target gear.

U.S. Pat. No. 6,067,847 to Staerzl discloses a running quality evaluator for an engine that allows a technician to monitor the running engine on a display and to make corrections for optimizing the engine function. Engine operating parameters such as spark timing can be adjusted to improve quality. The arrangement quantifies the running performance and outputs a signal that can be interpreted as an indicator of performance quality.

U.S. Pat. No. 6,178,373 to Davis et al. describes an engine control method that involves generating optimized control set points for fuel flow, airflow, exhaust gas recirculation, and spark ignition timing to balance emissions and fuel economy.

U.S. Pat. No. 6,356,831 to Michelini et al. relates to optimizing gear shifting performance in a manual transmission of an internal combustion engine and more particularly to optimizing gear shifting performance with a lean-capable engine that can operate in multiple combustion modes. An operator is given "shift up" and "shift down" indications on a shift schedule based on lowest cost value for fuel economy and vehicle emissions as a function of different engine combustion modes.

These devices and systems do not provide enough feedback to drivers, which forces drivers to rely on experience and "feel". Drivers also have no benchmark from which operating performance can be improved.

SUMMARY

Compared with the documents described above, Applicants' invention provides a driver with feedback on vehicle performance and the optimum operating point and on the throttle, transmission, and possibly other adjustments needed to attain the optimum operating point, or "sweet spot". In particular, an interface between the engine and the operator is provided that displays actions that must be taken to maintain the engine in its best performance, e.g., most fuel-efficient, operating region. In addition, the distance or time over which an engine or vehicle is operated or driven in the optimum performance range may be recorded, enabling comparison of operating intervals under different operator conditions and habits and provision of operator incentives for maintaining the engine or vehicle in the most efficient operating range. Thus, a driver can be rewarded, for example by increasing a vehicle's maximum road speed limit, for achieving operational performance targets that can be predefined. For a driver who is paid by distance traveled, this reward translates into additional income. Another advantage of Applicants' invention is that the percentage of operating distance or time spent in the engine's sweet spot during a defined measurement period, or running interval, is viewable and verifiable, for example within a vehicle's instrument cluster, on a per-driver basis if desired. Thus, a fleet manager can verify that drivers' performances have met expectations and can provide rewards like monetary bonuses. Further, sweet-spot data may be downloaded from a vehicle through a communication link, such as a satellite or cellular phone, to a "back office" application, thereby enabling a fleet owner or manager to view the efficiency of a driver in "real time".

In accordance with an aspect of the invention, there is provided a system for providing information to an operator of an engine such that the engine operates with optimal performance. The system includes a plurality of sensors adapted to measure operating parameters of the engine; an engine management system adapted to receive measured operating parameters from the sensors and to generate signals indicative of a current operating performance of the engine and signals indicative of performance-increasing adjustments to current operating parameters; and a display adapted to present symbols in response to signals from the engine management system. The symbols guide the operator to increase or maintain engine performance.

In accordance with another aspect of the invention, there is provided a method of providing information to an operator of an engine such that engine performance can be optimized. The method includes determining at least one current operating parameter of the engine; generating at least one signal indicative of at least one performance-increasing adjustment to the at least one current operating parameter; and presenting at least one symbol to the operator based on the at least one signal. The symbol guides the operator to increase or maintain engine performance.

BRIEF DESCRIPTION OF THE DRAWINGS

The several features, objects, and advantages of Applicants' invention will be understood by reading this description in conjunction with the drawings, in which.

DETAILED DESCRIPTION

Applicants' Engine Sweet Spot Indicator (ESSI) is a system that provides an engine operator such as a vehicle driver with the feedback needed to maintain high engine operating performance, e.g., fuel efficiency, communicating the engine's most efficient operating area, or sweet spot, to the driver under any operating condition. The ESSI interacts with the driver and provides instructions for controlling the engine in the most efficient manner, thereby giving the driver a tool that can minimize the operating cost of the vehicle or other engine-powered machine.

Figure 1:
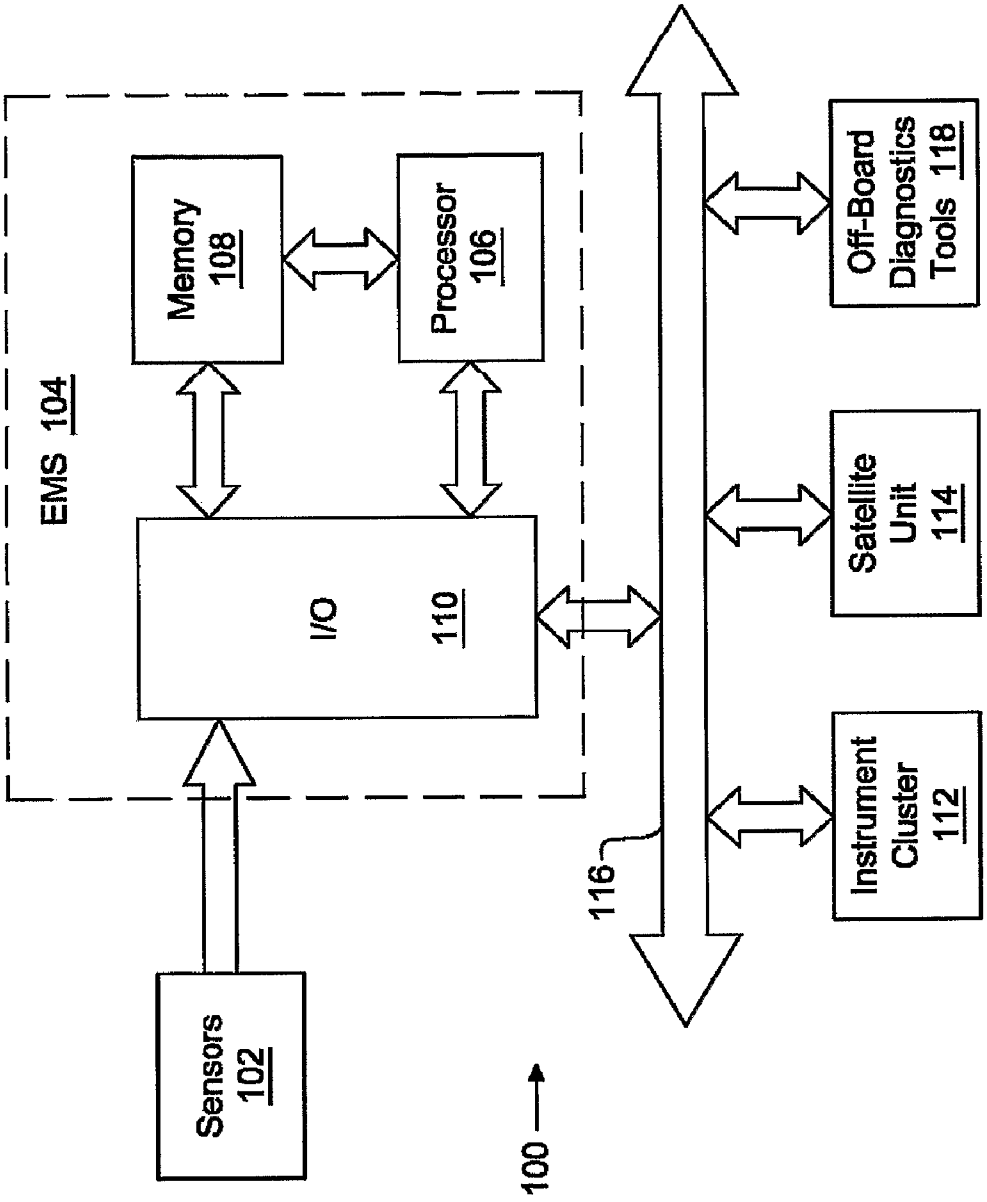
FIG. 1 is a block diagram of an engine sweet spot indicator.

The ESSI is an aid that advises the operator when the engine is being operated most efficiently. FIG. 1 is a block diagram of an exemplary ESSI 100. One or more suitable sensors 102 measure operating parameters of the engine, such as engine speed (RPM), intake charge air pressure and temperature, engine coolant and oil temperature, turbine boost pressure and temperature, fuel flow, ignition timing, etc., and send measured data to an engine management system (EMS) 104. For example, engine speed can be measured by sensors that determine camshaft and/or flywheel rotational speed and that provide measurement data about 100 times per second. A typical EMS 104 for a modern engine includes a processor 106 that executes programmed instructions for controlling the operation of the engine. These instructions are stored in a memory 108 with other information needed for operating the engine as desired, including for example the measured data from the sensors 102 that are passed to the memory 108 and processor 106 by suitable input/output (I/O) conditioning circuitry 110. As indicated by the double-headed arrows, information may flow bi-directionally among the processor, memory, and I/O circuitry, but it will be appreciated that there are many suitable arrangements of devices within an EMS.

As shown in FIG. 1, information from the sensors 102 and EMS 104 can flow through the I/O devices 110 to a number of other devices and displays provided in the vehicle or in association with the engine controlled by the EMS 104. In a vehicle like an over-the-highway truck, these other devices may include an instrument cluster 112 and a satellite unit 114 that can be conveniently connected in parallel to a suitable data bus 116 that may transport information in serial, parallel, or other suitable form. FIG. 1 also indicates that one or more off-board diagnostic tools and devices 118 may be connected to the data bus as desired. It will be appreciated that the sensors 102 also may pass their information through the data bus 116 rather than directly to the I/O circuitry 110 as shown.

Figure 2:
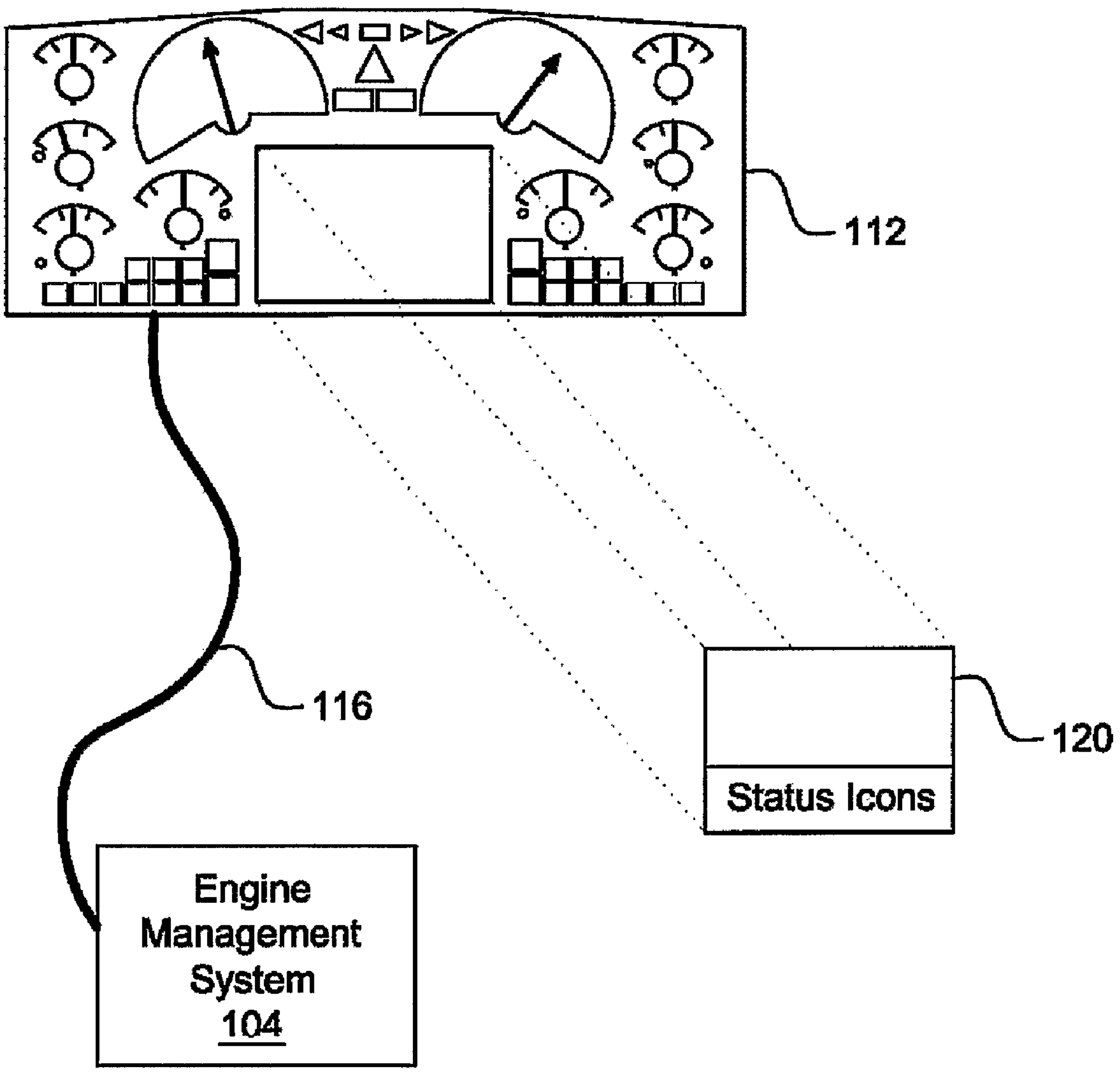
FIG. 2 is a diagram of an instrument cluster having a display connected through a data bus to an engine management system.

The instrument cluster 112 typically includes a number of gauges and displays that indicate selected operating conditions to an operator. An instrument cluster in a vehicle, for example, typically includes a speedometer and fuel-remaining gauge, as well as other gauges and devices, such as a keypad, touchscreen, or other device that an operator can use to enter information. A display device included in the instrument cluster 112 can serve as part of the human-machine interface (HMI) of the ESSI 100, but it will be appreciated that other visual and/or audio displays can be used. A suitable display device is a liquid crystal display (LCD) or other display device that is capable of presenting alphanumeric and icon characters in response to signals from an electronic processor or other circuit. Such an arrangement is depicted in FIG. 2, which shows an instrument cluster 112 having a display 120 that, with other devices as appropriate, is connected through the data bus 116 to the EMS 104.

One or more status icons or other characters displayed, for example in a status icon bar, of the instrument cluster 112 can be used to guide the driver into the engine's "sweet spot" by appropriately adjusting engine speed and/or another operating parameter. In one embodiment, the guidance includes icons indicating throttle position and/or gear selection, e.g., "increase throttle" or "shift up". For a vehicle having a manual transmission, the number of the optimum gear can be presented on the display 120. In addition, associated audible indications may be presented for these conditions, guiding the vehicle operator to the action required to get the engine into the sweet spot even without looking at the instrument cluster 112. The EMS 104 may be programmed to enable the audible and/or visible indications to be turned off and on according to driver preference that would be indicated, for example, by corresponding selections via keypad from a set-up menu presented on the display 120. While the "sweet spot" is attained, the display 120 presents a suitable status icon or character that indicates this. As described in more detail below, achieving this target for a sufficient distance or time period can give the driver a performance bonus, such as an increased speed limit.

Figure 3:
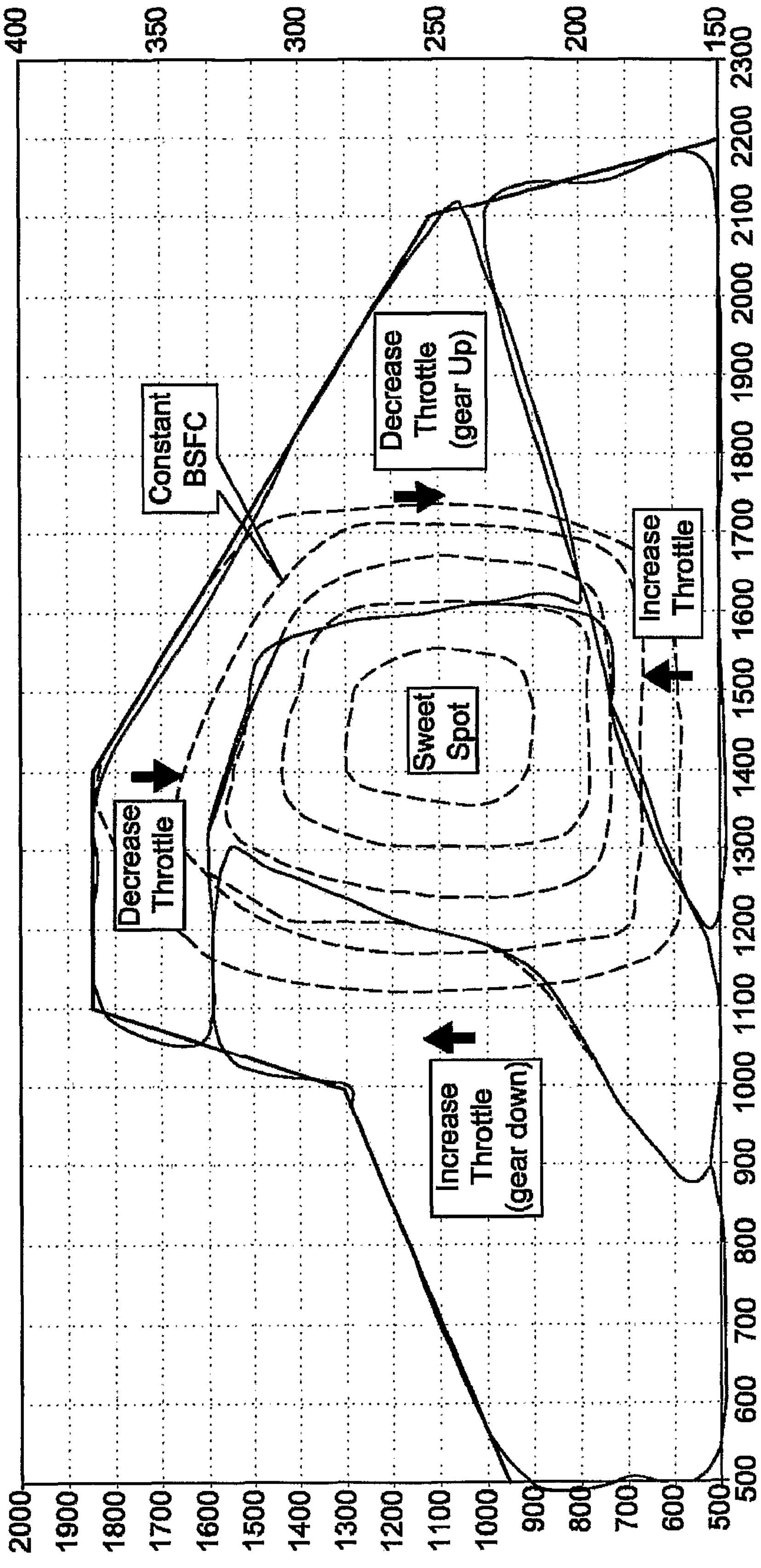
FIG. 3 is an example of an engine speed-torque map.

In general, a two-dimensional engine torque-speed map can define the sweet spot area in which the engine operates with maximum or near-maximum fuel efficiency, i.e., minimal brake specific fuel consumption (BSFC). BSFC is a parameter that indicates an engine's efficiency in terms of fuel usage and is the ratio of fuel flow in mass per unit time divided by horsepower. FIG. 3 is an example of such a torque-speed map, with engine speeds between 500 RPM and 2300 RPM indicated on the horizontal axis and engine torques between 500 pound-feet (lb-ft) (about 370 newton-meters (Nm)) and 2000 lb-ft (about 1480 Nm) indicated on the left-most vertical axis. The right-most vertical axis indicates horsepower. It will be appreciated that different engines have different torque-speed maps, which are readily determined in a number of ways, for example by running the engines on a dynamometer.

Several contours of constant BSFC are shown in FIG. 3, as is the sweet spot area of substantially minimal BSFC for engine speeds between about 1350 RPM and about 1550 RPM and engine torques between about 900 lb-ft (666 Nm) and about 1300 lb-ft (962 Nm). In general, operating conditions to the left of the sweet spot can be improved by increasing the throttle and/or gear-shifting down and operating conditions to the right of the sweet spot can be improved by decreasing the throttle and/or gear-shifting up. As indicated by FIG. 3, this guidance can be presented to an operator by up/down arrows in the display 120.

Optimization of engine performance by controlling engine torque and speed to minimize BSFC is currently important for applications of this invention in management of diesel engines such as those used in vehicle fleets, but it should be understood that these are not the only parameters that may be used. For example, it may be advantageous to control an engine, such as an engine in a stationary application like a power plant, so as to minimize exhaust emissions rather than BSFC. Moreover, FIG. 3 is only two-dimensional but this is not required; it will be appreciated that Applicants' invention can be used to optimize engine operation in higher-dimensional spaces, for example, spaces determined by torque and speed, as well as engine load, temperature, or pressure.

Figure 4:
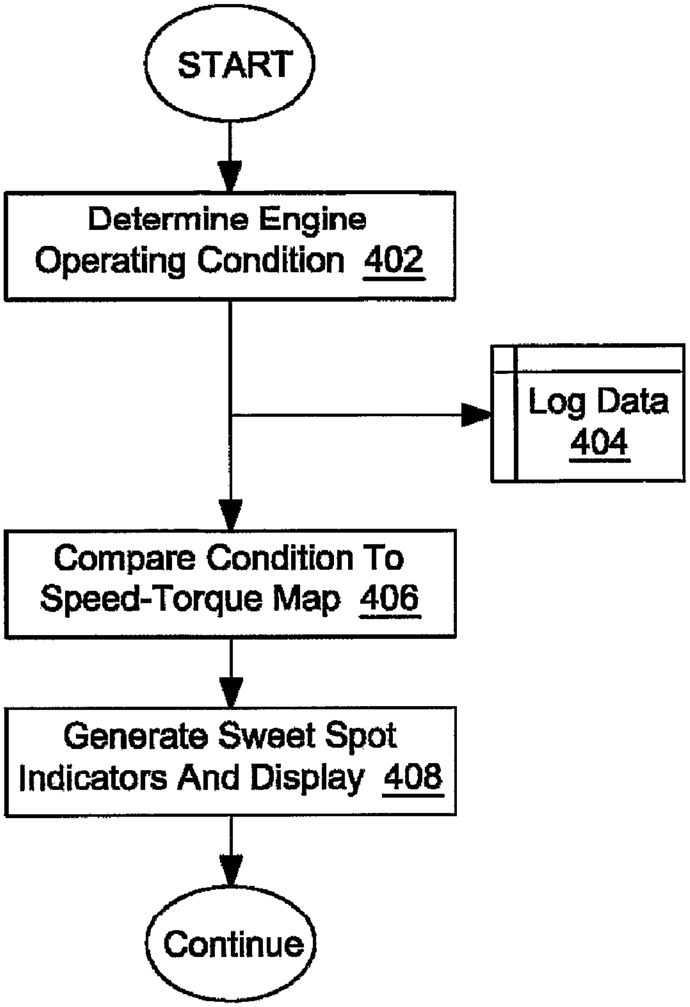
FIG. 4 is a flow chart of a method of engine sweet spot indication.

Experimentally determined torque-speed data may be stored as a look-up table in the memory 108 or may be reduced to one or more mathematical equations that are computed by the processor 106. During operation, the EMS 104 carries out a method that is illustrated by the flow chart of FIG. 4. In step 402, the EMS 104 periodically determines the operating conditions of engine torque and engine speed, logs that data (step 404), and compares those data to the stored torque-speed table or to values produced by suitable equations corresponding to such a table (step 406), thereby periodically determining locations in the torque-speed map. Engine speed is advantageously measured directly by a sensor 102 as described above while engine torque is computed by the processor 106 from fuel consumption and engine friction losses that are mathematically related to engine torque in a known way. Engine friction losses are typically determined experimentally by off-line dynamometer testing. In-operation fuel flow or consumption can be measured in several ways, for example by straight-forward computation using fuel pressure and injector stroke measurements.

Data representing the current location in the torque-speed map, after suitable conditioning, if necessary, is provided through the data bus 116 to the instrument cluster 112. The information from the EMS 104 is interpreted if necessary by the instrument cluster 112 and presented on the display 120 as symbols that inform the driver how to act, e.g., increase throttle, shift up, etc., to obtain an engine operating condition in or near the sweet spot area (step 408). It will be appreciated that the data rate of the EMS for running the engine may be different from, and usually higher than, the rate at which sweet spot indicators are presented and refreshed on the display 120. As described above, engine speed may be measured about 100 times per second, and for example sweet spot indicators may be updated about 1 time per second. Of course, other rates can be used.

It will be appreciated that the look-up table or equation(s) defining the torque-speed map may be stored in a memory associated with a processor in the instrument cluster or in another location, even a remote location, rather than in the EMS 104. If so, the EMS 104 need only provide engine operating data to such a processor, for example through the data bus 116 to a processor on the vehicle or-through a communication link, such as a satellite or cellular telephone or other wireless communication device, to a remote processor. As described in more detail below, the EMS 104 may determine and then present symbols indicating Sweet Spot Target and Sweet Spot Attained percentages.

The sweet spot data, i.e., the engine's torque-speed conditions, are advantageously logged by the EMS 104, for example by storing the data in the memory 108, possibly in association with an indication of the respective driver's or operator's identity. The stored data can be accessed, for example by the off-board diagnostics tools 118. Data such as the percentage of operating distance or time in the sweet spot can be retrieved from the vehicle memory 108 by a vehicle fleet manager to determine how efficiently the fleet's drivers are operating. This enables fleet operations management, and even an operator of a single vehicle, to recover measured individual vehicle and driver performance. It will be appreciated that the indicators presented to a vehicle operator can be readily adjusted through the software executed by the processor 106 if desired, subjecting a driver's perceived sweet spot to software control. Thus, a fleet operator may adjust a sweet spot target as drivers become more proficient with the ESSI or as it is determined that a target is out of reasonable reach of the drivers. The target value can be altered in a number of ways, for example by an off-board tool 118 that can write suitable data into the memory 108.

For an engine in a typical over-the-highway truck, sweet spot indicator data is advantageously broadcast by the EMS 104 and displayed by the instrument cluster 112 when a vehicle is moving at speeds greater than about 30 kilometers per hour (KPH) (about 20 miles per hour (MPH)), and may not be broadcast when the vehicle speed is less than the 30 KPH threshold. Even so, performance data can be logged and available for later retrieval as described above.

Referring again to FIG. 2, the display 120 can advantageously display a "% Sweet Spot Target" value, e.g., 50%, which is a selectable goal for operating distance or time spent in the sweet spot in comparison to total operating distance or time, and a "% Sweet Spot Attained" value, which is a measured ratio of operating distance or time spent in the sweet spot to total operating distance or time. The % Sweet Spot Attained value is updated periodically, e.g., every few seconds, so that a driver can see where his or her performance stands with respect to the target. This typically increases the amount of engine run-time that is spent in the efficient region.

The ESSI 100 may further include a performance award or bonus feature such that a driver is rewarded, e.g., with a higher speed limit and/or money or other value. The reward may be earned when a selected efficiency is achieved. As described above, a driver can input identity information to the ESSI, and data representing the percentage of running distance or time that the driver actually spent in the engine's sweet spot area during the preceding running interval are stored in the EMS 104, which can compare such stored actual data with a target percentage. The storage capacity needed for such data in a memory 108 is easily provided by currently available memory circuits. The target percentage may be defined by fleet management. The result of the comparison is a reward, or even a penalty, according to whether the actual sweet spot percentage is greater or less than the target percentage.

It will be understood that the performance bonus feature of the ESSI 100 can be used in many ways to assist a vehicle or fleet manager to achieve a wide variety of performance goals. For example, actual vs. target sweet spot percentage can be considered by itself in deciding whether to award a performance bonus, or the actual vs. target percentage can be considered along with other factors, such as a comparison of actual fuel economy with a target fuel economy and/or a comparison of actual idling time with a target idling time.

Instead of periodically completely resetting the sweet spot trip data, it can be more advantageous to accumulate data in a sliding window that represents a particular distance interval. The size of the window or running interval (in miles or kilometers) may be specified through an off-board diagnostic tool, such as a dealer communication system. Sweet spot trip data accumulated during the running interval, which may be 100 miles, may then be viewed as desired at different odometer readings. Each read-out of trip data preferably includes the percentage of running interval that the driver has spent in the sweet spot area during the previous running interval. It will be appreciated, of course, that the running interval may be a time period rather than a distance, or even another parameter, such as a fuel quantity, that is of interest to the operator, vehicle, or fleet manager.

Figure 5:
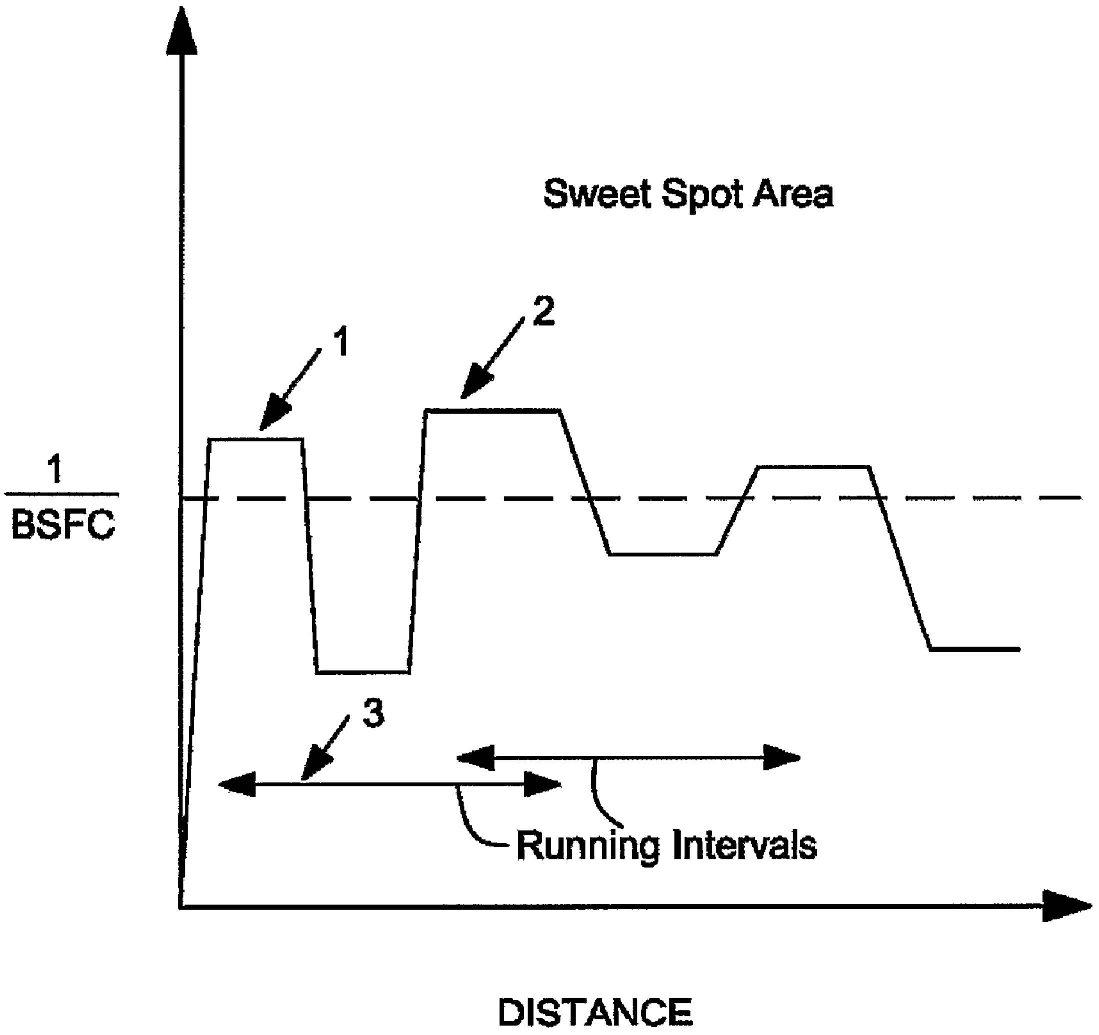
FIG. 5 is a plot depicting running intervals and operating performance over distance.

The running interval and target are preferably programmable parameters, thereby enabling adjustment of the dynamics of the sweet spot indicators and performance bonus features. The dynamics alter the ease and difficulty of attaining a sweet spot target percentage and getting or losing any performance bonus reward. The running interval is in effect a "rolling mileage buffer" as illustrated in FIG. 5, which is a plot of operating performance, as measured by the inverse of BSFC, versus distance. The sweet spot area is indicated in FIG. 5 by BSFC's lower than the dashed line, which corresponds to the central BSFC contour shown in FIG. 3.

When the running interval is a distance, the distance(s) through which the vehicle is operated in the sweet spot area are summed over a running interval and then converted to a percentage of the running interval. For example in FIG. 5, the distances 1 and 2 summed over the running interval 3 are more than 50% of the running interval, and so if the % Sweet Spot Target is set at 50%, the driver has attained the target, and might be entitled to a performance bonus award. Seeing the trip totals, e.g., the % Sweet Spot Attained, in the instrument cluster message display provides the operator with a status report on his or her driving habits. From there, the operator knows how near or far he or she is from achieving the sweet spot target. If this were not a running window, the farther an operator drove a vehicle, the less likely the driver might be to earn a reward because more and more distance would have to be spent in the sweet spot area. Thus, the running interval can be considered as a sliding window, with the % Sweet Spot Attained being computed at substantially non-overlapping positions of the window, i.e., for non-overlapping running intervals.

It will be appreciated that procedures described above may be carried out repetitively as necessary to control a vehicle. To facilitate understanding, many aspects of the invention are described in terms of sequences of actions that can be performed by, for example, elements of a programmable computer system. It will be recognized that the various actions could be performed by specialized circuits (e.g., discrete logic gates interconnected to perform a specialized function or application-specific integrated circuits), by program instructions executed by one or more processors, or by a combination of both.

Moreover, the invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM, EEPROM, or Flash memory), an optical fiber, and a portable compact disc read-only memory (CD-ROM).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A system for providing information to an operator of an engine such that engine performance can be optimized, comprising:

a plurality of sensors adapted to measure operating parameters of the engine;

an engine management system adapted to receive measured operating parameters from the sensors and to generate signals indicative of a current operating performance of the engine and signals indicative of performance-increasing adjustments to current operating parameters; and a display adapted to present symbols in response to signals from the engine management system, wherein the symbols guide the operator to increase or maintain engine performance;

wherein the signals indicative of performance-increasing adjustments are generated based on comparison of measured operating parameters to a set of predetermined operating parameters that represent a two-dimensional engine torque-speed map having an area in which the engine operates with maximal fuel efficiency, and the area in which the engine operates with maximal fuel efficiency is an area of minimal brake specific fuel consumption.

2. The system of claim 1, wherein one of the sensors measures engine speed and the engine management system computes engine torque from measured fuel consumption and predetermined engine friction losses.

3. The system of claim 1, wherein the symbols include associated indications that are audible to the operator.

4. The system of claim 1, wherein the engine management system includes an electronic processor adapted to execute programmed instructions for controlling the operation of the engine, and a memory that stores the programmed instructions and measured operating parameters from the sensors.

5. The system of claim 1, wherein the set of predetermined operating parameters are stored as a look-up table in a memory.

6. The system of claim 1, wherein the sensors are adapted to measure engine speed and fuel flow.

7. The system of claim 6, wherein the sensors measure a rotational speed of at least one of an engine camshaft and an engine flywheel, and maximizing engine fuel efficiency corresponds to increasing engine performance.

8. The system of claim 1, wherein the engine is included in a vehicle and the display is included in an instrument cluster that includes a plurality of gauges that indicate operating conditions of the vehicle.

9. The system of claim 8, wherein the symbols include at least one icon, and the at least one icon indicates at least one of a status of an award to the operator and a direction for the operator to alter at least one of torque and engine speed.

10. A system for providing information to an operator of an engine such that engine performance can be optimized, comprising:

a plurality of sensors adapted to measure operating parameters of the engine;

an engine management system adapted to receive measured operating parameters from the sensors and to generate signals indicative of a current operating performance of the engine and signals indicative of performance-increasing adjustments to current operating parameters; and a display adapted to present symbols in response to signals from the engine management system, wherein the symbols guide the operator to increase or maintain engine performance;

wherein the signals indicative of performance-increasing adjustments are generated based on comparison of measured operating parameters to a set of predetermined operating parameters; and data indicative of a ratio of distance over which the engine operated in an area of high performance to a predetermined running interval distance is computed by the engine management system.

11. The system of claim 10, wherein the area of high performance is adjustable by program instructions executed by the engine management system.

12. The system of claim 10, wherein the data is downloadable to a remote location through a communication link.

13. The system of claim 10, wherein the data are presented as at least one symbol on the display.

14. The system of claim 13, wherein the operator is awarded a performance bonus based on comparison of the data to a predetermined target.

15. A method of providing information to an operator of an engine such that engine performance can be optimized, comprising:

determining at least one current operating parameter of the engine;

generating at least one signal indicative of at least one performance-increasing adjustment to the at least one current operating parameter; and presenting at least one symbol to the operator based on the at least one signal, wherein the symbol guides the operator to increase or maintain engine performance;

wherein the at least one signal indicative of at least one performance-increasing adjustment is generated based on comparison of measured operating parameters to a set of predetermined operating parameters that represent a two-dimensional engine torque-speed map having an area in which the engine operates with maximal fuel efficiency, and the area in which the engine operates with maximal fuel efficiency is an area of minimal brake specific fuel consumption.

16. The method of claim 15, wherein the at least one symbol includes associated indications that are audible to the operator.

17. The method of claim 15, wherein the determining step comprises measuring engine speed and the generating step comprises computing engine torque from measured fuel consumption and predetermined engine friction losses.

18. The method of claim 15, wherein the set of predetermined operating parameters are stored as a look-up table in a memory.

19. The method of claim 15, wherein the determining step comprises measuring engine speed and fuel flow.

20. The method of claim 19, wherein measuring engine speed comprises measuring a rotational speed of at least one of an engine camshaft and an engine flywheel, and maximizing engine fuel efficiency corresponds to increasing engine performance.

21. The method of claim 15, wherein the engine is included in a vehicle and the at least one symbol is presented on a display that is included in an instrument cluster that includes a plurality of gauges that indicate operating conditions of the vehicle.

22. The method of claim 21, wherein the symbol includes at least one icon that indicates at least one of a status of an award to the operator and a direction for the operator to alter at least one of torque and engine speed.

23. A method of providing information to an operator of an engine such that engine performance can be optimized, comprising:

determining at least one current operating parameter of the engine;

generating at least one signal indicative of at least one performance-increasing adjustment to the at least one current operating parameter; and presenting at least one symbol to the operator based on the at least one signal, wherein the symbol guides the operator to increase or maintain engine performance;

wherein the at least one signal indicative of at least one performance-increasing adjustment is generated based on comparison of measured operating parameters to a set of predetermined operating parameters, and the generating step comprises computing data indicative of a ratio of distance over which the engine operated in an area of high performance to a predetermined running interval distance, and the at least one symbol is based on the data computed.

24. The method of claim 23, wherein the area of high performance is adjustable.

25. The method of claim 23, wherein the operator is awarded a performance bonus based on comparison of the data to a predetermined target.

26. The method of claim 23, wherein the data is downloadable to a remote location through a communication link.

* * * * *